(12) United States Patent
Looijen et al.

(10) Patent No.: US 10,859,472 B2
(45) Date of Patent: Dec. 8, 2020

(54) PISTON CORER AND METHOD OF ACQUIRING A SOIL SAMPLE

(71) Applicant: Fugro Technology B.V., Leidschendam (NL)

(72) Inventors: Peter Nicolaas Looijen, The Hague (NL); Adrianus Petrus Maria Brabander, Naaldwijk (NL)

(73) Assignee: Fugro Technology B.V.

( * ) Notice: Subject to any disclaimer, the term of this patent is extended or adjusted under 35 U.S.C. 154(b) by 191 days.

(21) Appl. No.: 16/163,192

(22) Filed: Oct. 17, 2018

(65) Prior Publication Data
US 2019/0113419 A1 Apr. 18, 2019

(30) Foreign Application Priority Data
Oct. 18, 2017 (NL) ...................................... 2019760

(51) Int. Cl.
| | |
|---|---|
| *G01N 1/08* | (2006.01) |
| *E21B 25/14* | (2006.01) |
| *E02D 1/04* | (2006.01) |

(52) U.S. Cl.
CPC .................. *G01N 1/08* (2013.01); *E02D 1/04* (2013.01); *E21B 25/14* (2013.01); *G01N 2001/085* (2013.01)

(58) Field of Classification Search
CPC ............ E02D 1/04; E21B 25/10; E21B 49/02
See application file for complete search history.

(56) References Cited

U.S. PATENT DOCUMENTS

| | | | |
|---|---|---|---|
| 4,930,587 A * | 6/1990 | Young .................... | E21B 25/14 |
| | | | 175/251 |
| 2005/0106751 A1* | 5/2005 | Masui ................... | E21B 49/025 |
| | | | 175/58 |

(Continued)

FOREIGN PATENT DOCUMENTS

| | | |
|---|---|---|
| DE | 3203667 A1 | 8/1983 |
| NL | 1004477 C1 | 12/1996 |

OTHER PUBLICATIONS

Search Report; Netherlands Application No. 2019760; dated Jun. 6, 2018.

(Continued)

*Primary Examiner* — Paul M. West
*Assistant Examiner* — Mark A Shabman
(74) *Attorney, Agent, or Firm* — Polsinelli PC

(57) ABSTRACT

The present document relates to a piston corer for acquiring a soil sample. The piston corer comprises a sample reception cylinder for taking in and retaining the soil sample, and which comprises a piston. The piston is moveable over a piston stroke inside the sample reception cylinder. An intake opening at a first end of the sample reception cylinder allows to receive the soil sample upon penetration of the ground, and the piston is configured to move in a direction away from the intake opening during taking in of the soil sample towards an end position of the piston stroke. The piston corer further comprises an activator cooperating with a valve arranged for closing of the intake opening upon activation. The activator is configured for activating a closing action of the valve in response to the piston reaching the end position of the piston stroke. The document further relates to a method of acquiring a soil sample using such a piston corer.

10 Claims, 3 Drawing Sheets

(56) References Cited

U.S. PATENT DOCUMENTS

2015/0068812 A1* 3/2015 Wesemeier ............. E21B 25/14
175/244
2016/0153869 A1 6/2016 Niu et al.

OTHER PUBLICATIONS

English Abstract of DE3203667; retrieved from www.espacenet.com on Oct. 16, 2018.
English Abstract of NL1004477; retrieved from www.espacenet.com on Oct. 16, 2018.

* cited by examiner

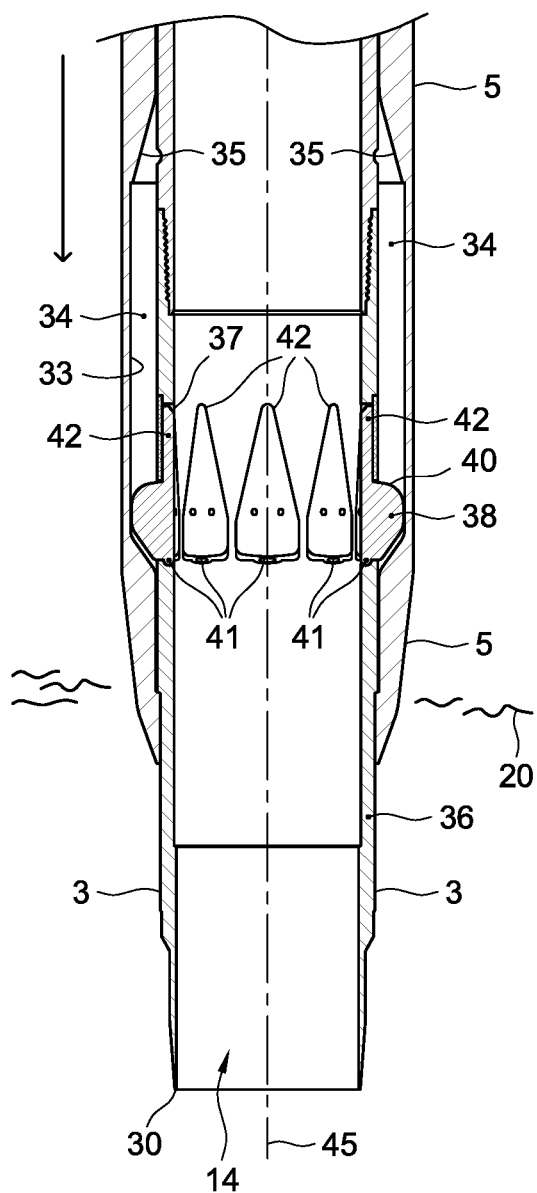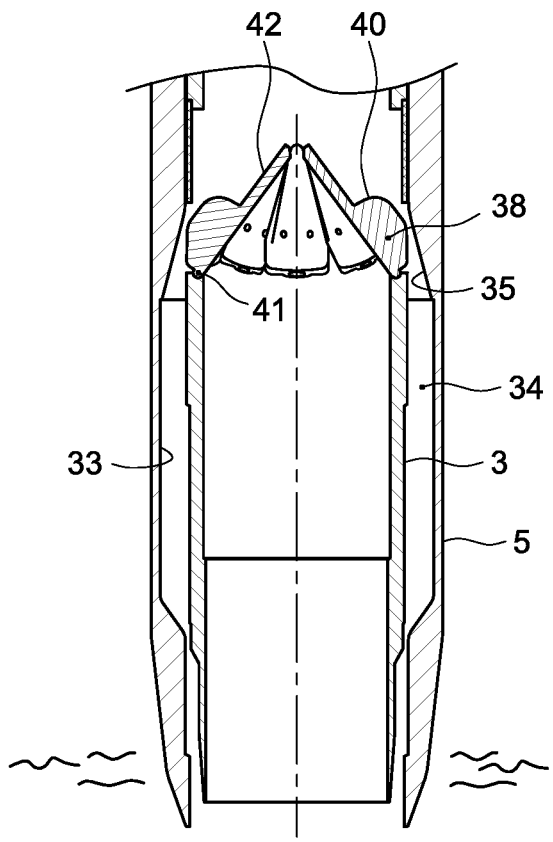
FIG. 3A
FIG. 3B

PISTON CORER AND METHOD OF ACQUIRING A SOIL SAMPLE

CROSS-REFERENCE TO RELATED APPLICATIONS

This Non-Provisional application claims priority to The Netherlands Application No. 2019760, filed Oct. 18, 2017, and which is entirely incorporated by reference herein.

FIELD OF THE INVENTION

The present invention is directed at a piston corer for acquiring a soil sample, the piston corer comprising a sample reception cylinder for taking in and retaining the soil sample in use, the sample reception cylinder comprising a piston, wherein the piston is moveable over a piston stroke inside the sample reception cylinder in a longitudinal direction thereof, the sample reception cylinder comprising an intake opening at a first end thereof for receiving the soil sample upon penetration of a ground by the piston corer, the piston being configured to move in a direction away from the intake opening during taking in of the soil sample towards an end position of the piston stroke. The invention further relates to a method of acquiring a soil sample using a piston corer.

BACKGROUND

For various purposes, the acquiring of soil samples is useful to identify soil parameters. For exploration at sea or natural water reserves such as large lakes or rivers, such soil samples are to be taken from the bed of the natural water reserve, such as the sea bed. Naturally, such samples may also be acquired from land. To acquire these soil samples, a hollow core or cylinder is forced into the ground or bed, which thereafter is pulled up and brought aboard of a research vessel or aboard a vehicle or other carrier.

By penetrating the ground or the sea bed with the hollow core, a soil sample is taken into the hollow core which upon ascending of the core is retained inside. The sample contains all subterranean layers that are penetrated by the core, which may in this way be secured for further research.

Originally, the sampling of soil samples is performed using a gravity corer. A gravity corer includes the hollow core and a large weight on top of it, and is released at the measurement position above the ground or bed such as to force the core into the bed under the load and impact of the weight on top of it. As an improvement to the gravity corer, a piston corer includes inside the hollow cylinder a piston that is moved upward while the hollow cylinder penetrates the seabed. Due to this improvement, a larger penetration depth is achievable in comparison to the gravity corer.

One disadvantage of the above mentioned types of corers, is that upon retrieval of the sample (when the corer is lifted upwards), there is a risk of losing part of the sample that has been taken into the cylinder of the corer. To prevent this, use is frequently made of core catchers that are located at the open end or intake opening of the hollow cylinder. These core catchers are typically formed of suitably shaped leave springs or other retaining elements, which allow the intake of the soil sample while resisting loss of the sample through the intake opening.

Although effectively preventing the loss of part of the sample, a further disadvantage that is not resolved by the present design of core catchers is that the core catchers always allow intake of the sample and only prevent loss thereof. For that reason, in the event that the corer will penetrate deeper than desired (for whatever reason) while the sampling cylinder is already filled, the intake of soil sample will continue and thereby compress the soil sample that is already in the cylinder. This decreases the quality of the sample and therefore the reliability of the analyzed data.

SUMMARY OF THE INVENTION

Although herein below, reference is frequently made to the taking of soil samples from beds of natural water reserves such as seabeds, it is to be understood that the teachings of this document may likewise be applied to soil sampling at land. Samples are in that case taken from the ground, e.g. by releasing a piston corer above the ground.

It is an object of the present invention to provide a piston corer that overcomes the abovementioned disadvantages of the prior art solutions, which effectively prevents loss of soil sample after intake thereof, and also prevents compression thereof during the sampling action.

To this end, there is provided herewith a piston corer for acquiring a soil sample the piston corer comprising a sample reception cylinder for taking in and retaining the soil sample in use, the sample reception cylinder comprising a piston, wherein the piston is moveable over a piston stroke inside the sample reception cylinder in a longitudinal direction thereof, the sample reception cylinder comprising an intake opening at a first end thereof for receiving the soil sample upon penetration of reservoir ground by the piston corer, the piston being configured to move in a direction away from the intake opening during taking in of the soil sample towards an end position of the piston stroke; wherein the piston corer further comprises an activator cooperating with a valve, the valve being arranged for closing of the intake opening upon activation thereof by the activator, wherein the activator is configured for activating a closing action of the valve in response to the piston reaching the end position of the piston stroke.

In the present document, reference will sometimes be made to a 'reception cylinder' and to an 'outer cylinder', while reference may also be made to 'inner barrel' and 'outer barrel'. These terms refer to the same elements of the piston corer of the present invention. The term 'inner barrel' refers to 'sample reception cylinder', the term 'outer barrel' refers to the 'outer cylinder'.

In accordance with the present invention, the piston corer comprises an activator that responds to the piston reaching the end position in the sample reception cylinder, for closing a valve that closes the intake opening of the sample reception cylinder. The piston typically reaches the end position in the reception cylinder at the moment that the sample reception cylinder is completely filled. Therefore, the closing of the valve prevents the intake of any further soil sample, and thereby prevents compressing of the soil sample that is already in the cylinder. At the same time, the closed sample cylinder may safely be recovered by the research vessel, without losing the soil sample. The closed valve will act as a core catcher upon recovery of the piston corer.

As the skilled person may appreciate, in certain situations, the penetration of the piston corer will not be deep enough to completely fill the sample reception cylinder. In those cases, the closing of the valve may still be achieved by moving the piston all the way to the end position in the sample reception cylinder. For example, in accordance with certain embodiments of the present invention, the piston corer comprises a corer cable for lowering and suspending the piston corer, wherein the piston is connected to the corer cable, wherein the moving of the piston during taking in of the soil sample is provided by cable force of the corer cable acting on the piston due to tensioning of the corer cable. In these embodiments, because recovery of the piston corer is achieved by using the corer cable as a hoisting line, recovery of the piston corer will automatically cause the piston to be pulled all the way to the end of the sample reception cylinder, which thereby closes the intake opening by closing the valve.

In accordance with certain of these embodiments, a length of the corer cable is adjustable such as to enable matching of the length of the corer cable to a local water depth or a release height above a ground at a measurement position, such as to set a starting depth for intake of a soil sample to the local water depth or the release height. As may be appreciated, it will be the length of the corer cable that determines the depth at which the piston is pulled away from the intake opening of the piston corer. This thereby sets the starting depth for intake of soil sample into the sample reception cylinder. By enabling the matching of the length of the corer cable to the local water depth of a natural water reserve or to a release height above the ground at the measurement position, it is possible to set the starting point for intake of the soil sample exactly at the top surface of the bed of the natural water reserve or at ground level when sampling at land. The release height, in the above, refers to the height above the ground at which the piston corer is released (e.g. when sampling at land).

In accordance with other embodiments of the present invention, the piston corer further comprises an outer cylinder, the outer cylinder being concentrically arranged around the sample reception cylinder such as to at least partially enclose the sample reception cylinder, wherein the sample reception cylinder is moveable relative the outer cylinder in the longitudinal direction thereof, and wherein the activator is configured for activating the closing action of the valve in response to the sample reception cylinder moving relative to the outer cylinder. The design of the piston corer including an outer cylinder that is concentrically arranged around (or at least partially around) the sample reception cylinder, enables the application of external friction forces (e.g. between the outer cylinder and the surrounding soil) to trigger the valve at the correct moment. As may be appreciated, a recovering action performed on the piston corer will change the direction of frictional forces on the outer cylinder, without these frictional forces acting on the sample reception cylinder. This can be used to cause the sample reception cylinder to move inside the outer cylinder, such as to activate the valve at the correct moment.

In particular in the embodiment wherein the piston of the piston corer is connected to the corer cable, hoisting the piston corer by the corer cable causes the lifting force to act on the piston corer upon the piston reaching the end position in the sample reception cylinder. The sample reception cylinder and the outer cylinder may be designed such as to cooperate with each other such as to cause the sample reception cylinder to move relative to the outer cylinder when the lifting occurs. This, in turn, can be used for activating the activator for closing of the valve.

For example in some of these embodiments, the activator comprises a protrusion element cooperating with a suitably shaped slot or recess in a inner wall of the outer cylinder. The protrusion element, for example, may be designed to freely move within a correspondingly shaped slot, whereas at one end of the slot the diameter of the inner wall becomes gradually more narrow such as to push the protrusion element inwards. This in turn may for example close the valve.

In accordance with some particular embodiments, the valve comprises at least one valve section which is connected to a wall of the sample reception cylinder via a hinged connection, wherein the protrusion element is attached to or integrated with the valve section such as to inwardly hinge the valve section upon activation, for closing of the intake opening. In this embodiment, the inward pushing of the protrusion element causes the valve section to hinge inwardly for closing of the valve. In some particular embodiments, the valve comprises a plurality of these valve sections that are circumferentially arranged across the wall of the sample reception cylinder. Each of these valve sections may comprise the abovementioned protrusion elements and the inner wall of the outer cylinder may around it circumference be suitable shaped to cooperate with the protrusions for closing of the valve as described above. In particular embodiments, in an open state of the valve, the valve sections are arranged in recesses of the wall of the sample reception cylinder. This provides the additional advantage that the valve itself does not narrow the cross section of the sample reception cylinder. One disadvantage experienced with existing core catchers, is that the arrangement of leaf springs and other elements that close the cylinder, also slightly narrow the intake opening of the cylinder. This as a result disturbs the sample which is taken into the corer. In the present embodiments of the invention, the valve sections are arranged in recesses of the wall of the sample reception cylinder while these are in the open state but therefore, provided that the depth of the recesses matches the thickness of the valve sections (or is slightly larger than that), the valve sections will not narrow the intake opening of the sample reception cylinder.

In accordance with further embodiments of the invention, the piston corer further comprises a locking mechanism for fixing the sample reception cylinder relative to the outer cylinder during descending of the piston corer, wherein the locking mechanism is configured for unlocking in response to the piston reaching the end position of the piston stroke. The locking mechanism prevents accidental movement of the sample reception cylinder inside the outer cylinder prior to the moment that the valve is intended to close. Moreover, the locking mechanism thereby contributes to the activation of the activator that operates the valve. During descend of the piston corer through the water, the sample reception cylinder is kept fixed to the outer cylinder by means of the locking mechanism. Also during intake of the soil sample, when the piston has not yet reached the end position of the sample reception cylinder, the sample reception cylinder and the outer cylinder are fixed relative to each other via the locking mechanism. Therefore, during sampling, relative motion between the sample reception cylinder and the outer cylinder is prevented. Upon reaching the end position in the sample reception cylinder, a piston may activate a further activator that performs an unlocking of the locking mechanism. As a result, while the outer cylinder continues to penetrate the soil over a small distance whereas the piston is attached to the corer cable which keeps the sample reception cylinder at the depth reached, the relative motion between the sample reception cylinder and the outer cylinder will cause the valve activator (e.g. the protrusion elements that cooperate with the inner wall of the outer cylinder) to close the valve that closes the intake opening. This valve remains to be closed during ascend of the piston corer towards the vessel.

In accordance with a second aspect of the present invention there is provided a method of acquiring a soil sample, using a piston corer, wherein the piston corer comprises a sample reception cylinder comprising a piston, wherein the piston is moveable over a piston stroke inside the sample reception cylinder in a longitudinal direction thereof, the method comprising releasing the piston corer at a measurement position, taking in the soil sample through an intake opening at a first end of the sample reception cylinder, wherein the piston moves in a direction away from the intake opening during taking in of the soil sample towards an end position of the piston stroke, wherein the piston corer further comprises an activator cooperating with a valve, the valve being arranged for closing of the intake opening upon activation thereof by the activator, wherein the method further comprises activating a closing action of the valve in response to the piston reaching the end position of the piston stroke.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIGS. 3A and 3B schematically indicate a valve actuation mechanism for a piston corer in accordance with an embodiment of the present invention.

DETAILED DESCRIPTION

Figure 1:
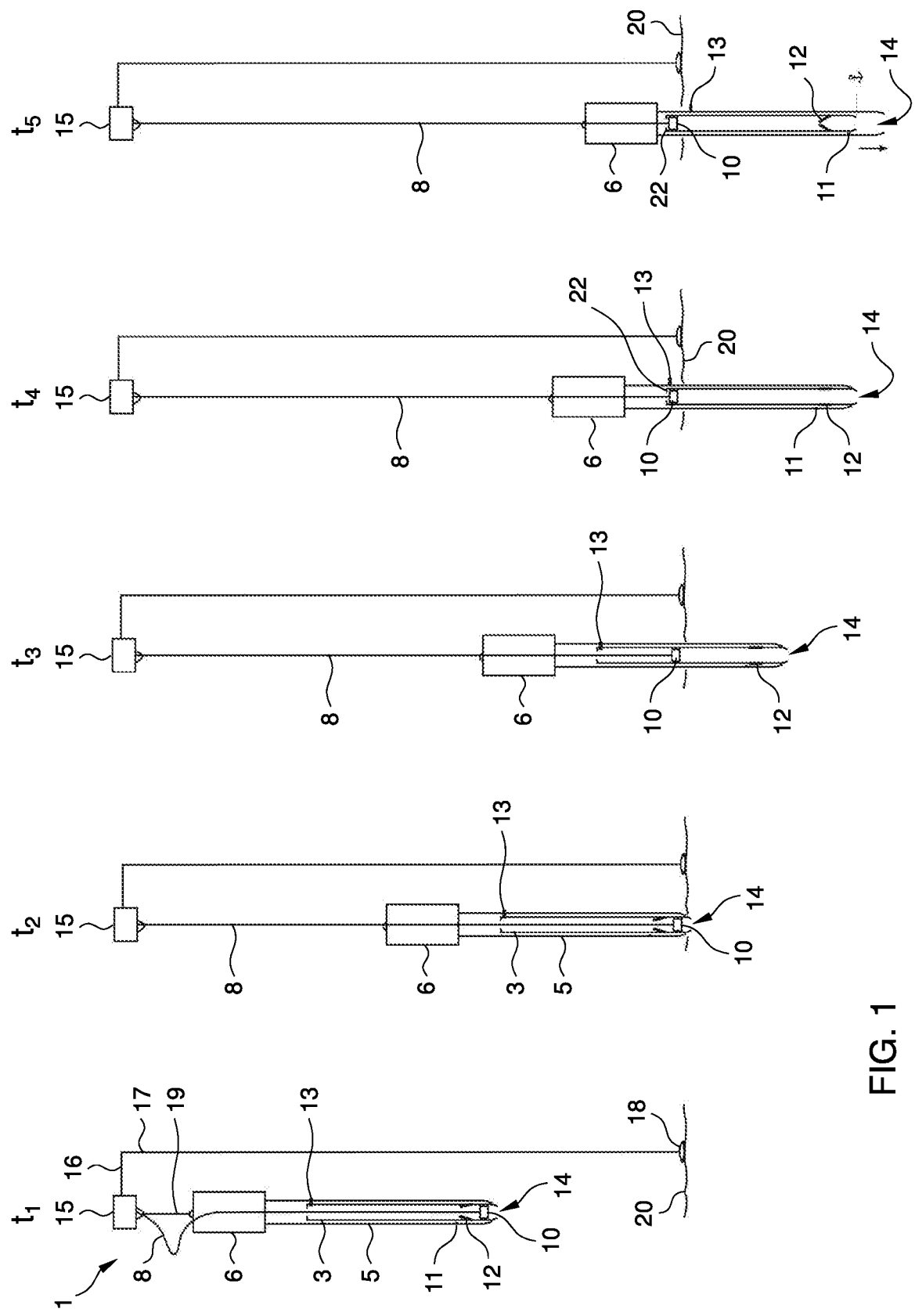
FIG. 1 schematically indicates the method of the present invention using a piston corer in accordance with the present invention in accordance with an embodiment thereof.

In FIG. 1 a method in accordance with an embodiment of the present invention is schematically illustrated. FIG. 1 illustrates a piston corer 1 being released towards the seabed 20, and illustrates the situation at five different moments in time: $t_1 < t_2 < t_3 < t_4 < t_5$. The piston corer 1 comprises a trigger mechanism 15 which allows to release the piston corer at a certain height above the seabed 20. The trigger mechanism 15 is attached to a further cable (not shown) that is retained on a research vessel at the surface. The trigger mechanism 15 including the piston corer 1 is released from the vessel and under the weight of the arrangement descends towards the seabed 20. The trigger mechanism 15 comprises a trigger arm 16 and a trigger line 17 including a counter weight 18. As soon as the counterweight 18 impacts the seabed 20, arm 16 shortly moves upward, thereby triggering the trigger mechanism 15. When this happens, retaining line 19 disconnects from the weight 6 to release the remainder of the piston corer 1.

A piston 10 inside the piston corer is connected to the corer cable 8, which in turn is connected to the trigger mechanism 15. The length of the corer cable 8 is chosen such that the piston 10, when the corer cable 8 is completely stretched, is just above the seabed 20. The piston corer 1 further comprises a weight 6 to which there is connected an outer cylinder 5. Inside the outer cylinder 5 there is a sample reception cylinder 3. The 'outer cylinder 5' will hereinafter be referred to as 'outer barrel 5', and the 'sample reception cylinder 3' will hereinafter be referred to as 'inner barrel 3'. The inner barrel 3 at a front end thereof comprises an intake opening 14. Behind the intake opening 14 inside the inner barrel 3, there is a valve 12 cooperating with a valve activation mechanism 11. Moreover, a locking mechanism 13 interlocks the inner barrel 3 with the outer barrel 3 such that the inner barrel 3 is fixed with respect to the outer barrel 5.

At time $t_1$, counterweight 18 hits the seabed 20, triggering trigger mechanism 15 to release the piston corer 1. The piston corer starts descending towards the seabed 20, and in the situation in $t_2$, the corer cable 8 is completely stretched while a front end of the piston corer 1 has reached the seabed 20. However under influence of the weight 6, the piston corer 1 continues to descend to thereby penetrate the seabed 20. Because the piston 10 is connected to the core cable 8, which is completely stretched, the piston 10 remains at the depth indicated, just above the seabed 20. Only the inner barrel 3, outer barrel 5 and weight 6 continue to descend towards the seabed 20. While penetrating the seabed 20, a soil sample is taken in through the intake opening 14 of the inner barrel 3.

At time $t_3$, the piston corer has halfway penetrated the seabed 20. The piston 10 still resides at the depth just above the seabed. As can be seen in FIG. 1, the valve 12 as a result of the sample intake opening 14, has been forced in a fully opened position such as to allow the soil sample to be taken in.

At time $t_4$, the piston 10, still being at the same depth as where it was on time $t_2$, has reached the end position 22 of the inner barrel 3. In fact, it is the inner barrel 3 which has penetrated the soil of the seabed 20 across such a length that the piston ends up at the end position 22 in the inner barrel 3. In accordance with the embodiment illustrated in FIG. 1, due to the piston 10 reaching the end position 22, the locking mechanism 13 between the outer barrel 5 and the inner barrel 3 is activated and unlocks. As a result, the inner barrel 3 becomes moveable with respect to the outer barrel 5. In the situation illustrated in FIG. 1, the seabed 20 is relatively soft, and because the weight 6 has not yet reached the seabed 20, the piston corer 1 may continue to descend into the seabed 20.

As illustrated in the situation $t_5$, the piston corer has further penetrated the seabed 20. However, because the piston is connected to the corer cable 8 and is thereby retained at its depth just above the seabed, whereas the piston 10 also retains the end position 22 of the inner barrel 3, the inner barrel 3 with respect to the outer barrel 5 has moved upward (in fact the outer barrel 5 has continued to move downward, while the inner barrel 3 has been retained in position). Due to this relative movement between the outer barrel 5 and inner barrel 3, the valve 12 has moved passed the activation mechanism 11 which has caused the valve 12 to close, and to thereby secure the soil sample inside the inner barrel 3. The piston corer 1 has now come to a complete stop, and may be recovered by lifting the trigger mechanism 15 such as to ascend the piston corer 1.

Figure 2:
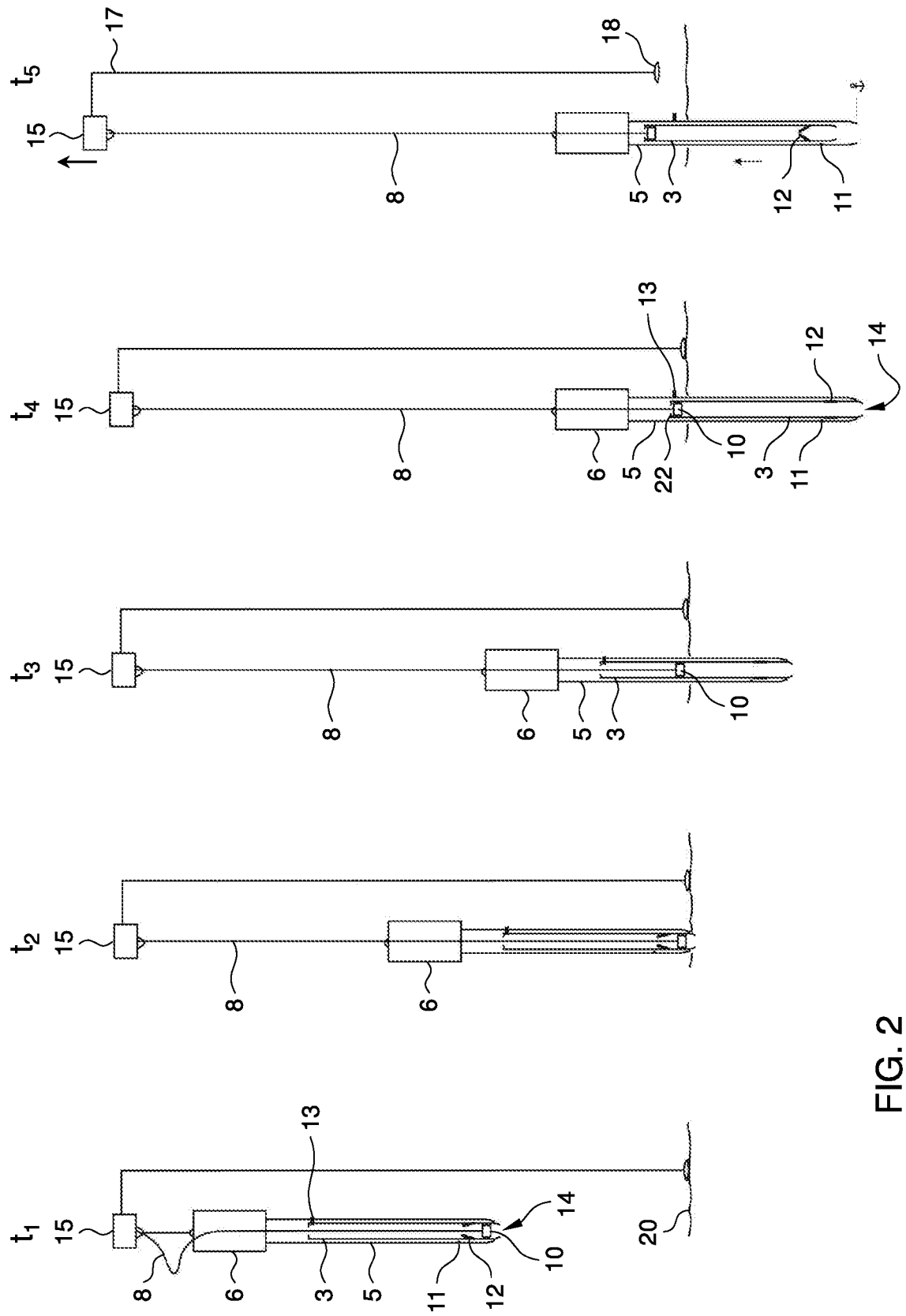
FIG. 2 schematically illustrates a further embodiment of the method of the present invention using a piston corer in accordance with an embodiment of the present invention.

The method in accordance with a second embodiment of the present invention is illustrated in FIG. 2. The situation at times $t_1$, $t_2$, and $t_3$ of FIG. 2 is identical to the situation illustrates at times $t_1$, $t_2$, and $t_3$ of FIG. 1, and does not require any further discussion for that reason. At time $t_4$, the situation appears to be identical to the situation in $t_4$ of FIG. 1, however the difference between the situation of FIG. 1 and the situation of FIG. 2 is that in FIG. 2, the piston corer 1 has come to a complete stop while the valve 12 has not yet been activated. Now by lifting the piston corer 1 upwards, the piston 10 will end up in the end position 22 of the inner barrel 3, thereby unlocking the locking mechanism 13 and enabling the inner barrel 3 to move upwards under influence of the action on the corer cable 8. As can be seen in the situation of $t_5$, the valve 12 thereby moves passed the activation mechanism 11 such as to close the valve 12 and secure the soil sample inside the inner barrel 3. The piston corer is lifted upwards by lifting the trigger mechanism 15.

A cross section of the valve and the valve activation mechanism is illustrated in FIGS. 3A and 3B. In these figures, just one embodiment of the valve mechanism in accordance with the present invention has been illustrated, whereas the skilled person will appreciate that numerous modifications of such a valve may be designed without departing from the present invention. For example whereas the valve mechanism in FIG. 3 is comprised of a plurality of valve sections 42, also a single valve element may be designed to close the intake opening 14. Moreover, also the activation mechanism of the valve may differ between embodiments.

In FIG. 3A, the outer barrel 5 and the inner barrel 3 are illustrated relative to each other. FIG. 3A illustrates the situation wherein the piston corer 1 descends towards the seabed. The seabed 20 is schematically illustrated in the figure. The sharp edges of the barrel head 30 allow the piston corer to easily penetrate the sea floor. In FIG. 3A, also the longitudinal axis 45 through the piston corer is schematically illustrated by a dotted line.

The valve comprises a plurality of valve sections 42 that are to be closed jointly upon activation thereof. Each valve section 42 comprises a hinge 41 with which it is attached to the wall 36 of the inner barrel 3. A plurality of recesses 37 in the circumference of the wall 30 allow to receive the valve sections 42 such that they do not disturb the intake of the soil sample. The inner wall 33 of the outer barrel 5 comprises slots or, in the situation of FIG. 3A, a widened cross section. This allows activation elements 40 of the activator 38 to reside in an open position as illustrated in FIG. 3A. The widened portion 34 of the inner wall 33 of the outer barrel 5, at least at one end thereof, comprises an inward narrowing at 35.

FIG. 3B illustrates the situation where the inner barrel 3 moves upwards relative to the outer barrel 5. By this relative movement between the inner barrel 3 and the outer barrel 5, the protrusion elements 40 or activation elements 40 are pushed inwards by the narrowed section 35 of the inner wall 33 of the outer barrel 5. As a result, the hinged valve sections 42 are all pushed inwards to thereby close the valve.

Unlike conventional valves or core catchers the piston corer including the activated valve of the present invention takes care of three aspects that are advantageous for acquiring quality samples. Firstly, as may be seen in FIG. 3A, the valve formed of valve sections 42 is fully opened during penetration so no disturbance of the soil entering the inner barrel. Secondly, as follows from FIG. 1, the valve 12 prevents oversampling or compression of the sample as it is forced to close at the end of the piston stroke. And thirdly, once closed the valve 12 preserves and protect the soil during its ascent to the vessel, even in the event that the piston 10 upon descending of the corer 1 did not reach the end 22 of the piston stroke.

The corer consist of two barrels; an inner barrel 3 and an outer barrel 5. Both barrels are locked together, for example at the top, and move simultaneously when penetrating the sampler into the soil. The piston moves inside the inner barrel 3 and once the end 22 of the piston stroke has been reached, the inner barrel 3 unlocks from the outer barrel 5. The outer barrel 5 will now move independent from the inner barrel 3, as may be seen in FIG. 1. The inner barrel 3 will be stationary in relation to the soil.

Due to relative motion of the outer barrel 5 with regards to the inner barrel 3, the valve 12 will be activated and will be closed. There are various occasions wherein the valve closes when the piston 10 reaches the end 22 of the piston stroke inside the inner barrel 3. For example, when the corer 1 has come a stop due to the friction forces on the barrel 5 with the head above seabed level, i.e. penetration is incomplete in the sense that the inner barrel 3 is not completely filled with soil sample. In this case both the inner barrel 3 and the outer barrel 5 will come to a standstill in a inter locked state. When pulling the lift wire or corer cable 8 in order to pull the corer 1 out of the bottom 20 the inner barrel 3 is unlocked first is pulled up against an internal block of the outer barrel 5. During this stroke the valve is closed. The outer barrel 5 will remain in the soil and provides sufficient reaction to closed the valve 12. Once the inner barrel 3 is pulled against the block both the inner 3 and outer barrel 5 will be pulled out of the soil 20. In another example, when the corer 1 comes to a stop with the head penetrated into the soil 20. At the end 22 of the piston stroke, the outer barrel 5 and inner barrel 3 unlock. The outer barrel 5 might penetrate a further depth length but the inner barrel 3 remains at the same depth, being retained by the corer cable 8 via the piston 10. The valve 12 will close upon the downward movement of the outer barrel 5. As the inner barrel 3 is stationary in relation to the seabed 20, no soil is entering the inner barrel 3 and no oversampling or core compression will occur.

In both cases oversampling or core compression is prevented at all times. Reaching a full piston stroke however does not always mean that full recovery is obtained as this is determined by the internal friction of the inner barrel and the inner clearance of the cutting shoe. This is referred to as plugging. The length of the corer cable 8 does not have an effect on how the valve operates and only influences the starting point where the stroke and therefor the sampling starts. Ideally at the cross-over point to the seabed 20. In case the corer cable 8 is chosen too short the sampling starts above seabed 20 and if the piston cable 8 is too long sampling starts below mud level.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A piston corer for acquiring a soil sample, the piston corer comprising:
    a sample reception cylinder which comprises a piston, wherein the piston is moveable over a piston stroke inside the sample reception cylinder in a longitudinal direction thereof,
    the sample reception cylinder comprising an intake opening at a first end thereof, the piston being configured to move in a direction away from the intake opening during taking in of the soil sample towards an end position of the piston stroke;
    an activator cooperating with a valve, the valve being configured for closing of the intake opening upon activation thereof by the activator, wherein the activator is configured for activating a closing action of the valve in response to the piston reaching the end position of the piston stroke;
    an outer cylinder which is concentrically arranged around the sample reception cylinder to thereby at least partially enclose the sample reception cylinder, wherein the sample reception cylinder is moveable relative the outer cylinder in the longitudinal direction thereof, and wherein the activator is configured for activating the closing action of the valve in response to the sample reception cylinder moving relative to the outer cylinder; and
    a locking mechanism for fixing the sample reception cylinder relative to the outer cylinder during descending of the piston corer, wherein the locking mechanism is configured for unlocking in response to the piston reaching the end position of the piston stroke.

2. The piston corer according to claim 1, wherein the piston corer comprises a corer cable connecting to the piston, wherein the moving of the piston during taking in of the soil sample is provided by cable force of the corer cable acting on the piston due to tensioning of the corer cable.

3. The piston corer according to claim 2, wherein a length of the corer cable is adjustable to enable matching of the length of the corer cable to a local water depth or release height above a ground at a measurement position.

4. The piston corer according to claim 1, wherein the activator comprises a protrusion element cooperating with a suitably shaped slot or recess in an inner wall of the outer cylinder.

5. The piston corer according to claim 4, wherein the valve comprises at least one valve section connected to a wall of the sample reception cylinder via a hinged connection, wherein the protrusion element is attached to or integrated with the valve section to inwardly hinge the valve section upon activation, for closing the intake opening.

6. The piston corer according to claim 5, wherein the valve comprises a plurality of said valve sections arranged circumferentially across the wall of the sample reception cylinder, and wherein in an open state of the valve the valve sections are arranged in recesses of the wall of the sample reception cylinder.

7. The piston corer according to claim 1, wherein the piston corer comprises a further activator configured for activating the unlocking of the locking mechanism in response to the piston reaching the end position of the piston stroke.

8. A method of acquiring a soil sample using a piston corer, wherein the piston corer comprises a sample reception cylinder comprising a piston, wherein the piston is moveable over a piston stroke inside the sample reception cylinder in a longitudinal direction thereof, the method comprising:
    releasing the piston corer at a measurement position;
    taking in the soil sample through an intake opening at a first end of the sample reception cylinder, wherein the piston moves in a direction away from the intake opening during taking in of the soil sample towards an end position of the piston stroke;
    activating, via activator cooperating with a valve, a closing action of the valve in response to the piston reaching the end position of the piston stroke, wherein the closing action of the value closes the intake opening;
    fixing, using a locking mechanism, the sample reception cylinder relative to the outer cylinder during descending of the piston corer; and
    unlocking the locking mechanism in response to the piston reaching the end position of the piston stroke.

9. The method according to claim 8, wherein the piston corer is connected to a corer cable, and wherein during the releasing of the piston corer, a first cable end of the corer cable is retained, and wherein the piston is connected to a second cable end of the corer cable, wherein the moving of the piston during taking in of the soil sample is provided by cable force of the corer cable acting on the piston due to tensioning of the corer cable.

10. The method according to claim 8, wherein the piston corer further comprises an outer cylinder, the outer cylinder being concentrically arranged around the sample reception cylinder to thereby at least partially enclose the sample reception cylinder, wherein the sample reception cylinder is moveable relative the outer cylinder in the longitudinal direction thereof, and
    wherein the method comprises activating, by the activator, the closing action of the valve in response to the sample reception cylinder moving relative to the outer cylinder.

* * * * *